Figure 1:
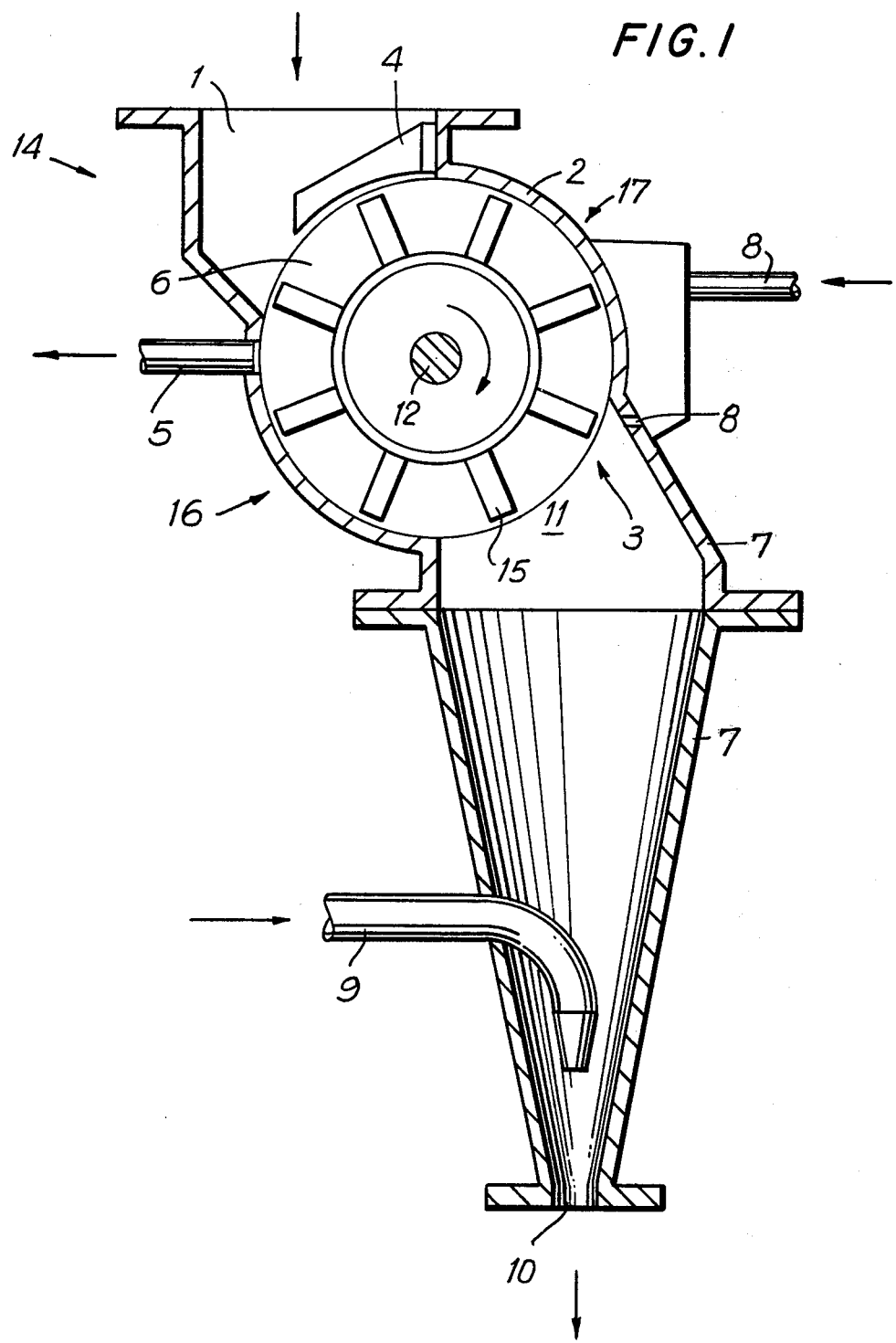

United States Patent [19]

Suhner

[11] 4,145,521

[45] Mar. 20, 1979

[54] METHOD OF DISCHARGING AND METERING SOLIDS IN LIQUIDS

[75] Inventor: Werner Suhner, Trimmis, Switzerland

[73] Assignee: Inventa AG fur Forschung und Patentverwertung, Zurich, Zurich, Switzerland

[21] Appl. No.: 799,493

[22] Filed: May 23, 1977

[51] Int. Cl.² ............................................. C08G 69/46
[52] U.S. Cl. ..................................... 528/323; 528/335
[58] Field of Search ................. 260/78 S, 78 A, 78 L; 528/335, 323; 526/65, 66

[56] References Cited

U.S. PATENT DOCUMENTS

| | | | |
|---|---|---|---|
| 3,149,095 | 9/1964 | Cerutti | 260/78 S |
| 3,373,145 | 3/1968 | Wagner | 260/78 S |
| 3,539,539 | 11/1970 | Goetzke | 260/78 S |
| 3,639,659 | 2/1972 | Nieswandt et al. | 260/78 S |
| 3,987,015 | 10/1976 | Driscoll et al. | 260/78 S |

*Primary Examiner*—Harold D. Anderson
*Attorney, Agent, or Firm*—Bierman & Bierman

[57] ABSTRACT

A method for the continous transfer of pourable solids such as granular solids by means of a liquid of lesser density is disclosed. The solid is mixed with and carried by the liquid through an inlet and a rotary zone. The rate of flow of the solids into the rotary zone is controlled by the selective withdrawal of liquid from the rotary zone. The rotary zone comprises rotating volumes that carry the solids and liquid to an outlet in the rotary zone. An additional liquid is injected adjacent the outlet so that the solids are emptied from the volumes into the outlet. An apparatus for carrying out the method according to the invention is also disclosed.

21 Claims, 2 Drawing Figures

METHOD OF DISCHARGING AND METERING SOLIDS IN LIQUIDS

The continuous transfer of pourable solids from a treating apparatus to the next apparatus while they are still mixed with a treating liquid less dense than the solids has always been a problem. Previously, it has been difficult to separate the treating apparatus from the transfer apparatus and obtain a regular flow of these pourable solids without damaging them.

For example, when treating polyamides granules in a washing column, it is desirable to transfer the mixture of the polyamide granules in the washing liquid to the next apparatus such as a centrifuge. The washing liquid is less dense than the polyamide granules and is usually water. Prior to this invention, the problem of obtaining a uniform flow of polyamide granules had been solved by forcing the granules out and regulating them with a metering screw or shut-off valve. In other instances, sludge pumps have been used for conveying the granules. Neither of these methods has proved desirable because the granules stick together and devices, such as rotary valves, cause shearing of the grains of the granular material which reduces the quality of the end product. In addition, the regulating devices are damaged in the process by the stuck-together granules. Volumetric regulation where the flow rate of the mixture is regulated has been abandoned as impractical.

An economically acceptable solution to the problem of regulating the flow of pourable solids while not damaging them or the transfer apparatus has heretofore not been found. It is therefore the aim of this invention to develop a method and apparatus which insures a high degree of water tightness and allows regulation of the flow of these pourable solids without damaging any of the grains thereof.

GENERAL DESCRIPTION OF THE INVENTION

In accordance with the present invention, a pourable solid, such as polyamide granules, is mixed with a less dense liquid. Ordinarily, this liquid will be the treating liquid in the previous process step, e.g. the wash liquid in a washing column for treating polyamide granules. Where polyamide granules are concerned, the washing liquid is usually water. The object of the invention is to provide a method of transferring these granules, without damaging them, in a uniform and controllable flow by means of some treating liquid and an additional transfer liquid (which is usually the same substance) to the next apparatus. In the case of polyamide granules in a washing column, the next apparatus would be a centrifuge.

The solids are mixed with a liquid of lesser density to form a mixture. The mixture is moved downwardly into an inlet zone which may comprise an inlet chamber so that the inlet zone is filled with liquid. The mixture is then moved downwardly from the inlet zone into a rotary zone comprising radially directed, circumferentially spaced-apart volumes which are rotating at a uniform speed. A chamber substantially filled by a rotary valve would be suitable for this purpose.

The mixture is conveyed by the rotating volumes to an outlet zone circumferentially spaced apart from the inlet zone. The mixture is then emptied from the rotating volumes into the outlet zone. Additional liquid of lesser density than the solids is injected into or adjacent the volumes at the outlet zone to produce a turbulence in the volumes and outlet zone. This turbulence insures that the solids are completely emptied from the volumes into the outlet zone and maintains the outlet zone filled with liquid and additional liquid.

The movement of the mixture from the inlet zone into the rotary zone is controlled by selectively withdrawing the liquid from the rotary zone immediately prior to the inlet zone and after the emptying of the volumes. Movement of the mixture is controlled so that the level of solids in the volumes is maintained below a level at which the solids are damaged by the rotating volumes and rotary zone. Where the rotating volumes comprise a rotary valve having a plurality of radially directed, circumferentially spaced apart rotors, if the volumes are overly filled with solids, the solids will be damaged by the rotors and chamber containing the rotary valve. It is preferred that the solids fill no more than 50% of any one volume.

In an apparatus for carrying out this method, it is preferred that an inlet chamber comprising the inlet zone be connected to an upper portion of a rotary chamber (rotary zone) which is substantially filled by a rotary valve (as above described) and that an outlet zone be provided in the lower portion of the rotary chamber. It is more preferred that the inlet chamber and outlet be located opposite each other about the circumference of the rotary chamber. Means for injecting liquid is located in the rotary chamber prior to the emptying of the volumes and adjacent the outlet. Means for withdrawing the liquid (usually washing liquid) is located in the rotary chamber adjacent the inlet chamber prior to the filling of the volumes. It is advantageous that these means be substantially opposite each other in the rotary chamber.

It is also preferred that the inlet chamber have a protecting member adjacent the inner wall toward which the volumes rotate. This member should be spaced apart from the rotors so that the solids are prevented from being crushed between the inlet chamber, rotary chamber, and rotors.

According to the method of this invention, it is also preferred that the mixture be moved from the outlet zone through a discharge zone. It is more preferred that the discharge zone be below the outlet zone, that it taper from the outlet zone, and that it further comprise a means for selectively introducing a flow of discharge liquid into the discharge zone. An apparatus for the discharge zone can comprise a chamber connected to the rotary chamber at its outlet which tapers downwardly and away from the outlet to form an orifice at its other end. It is preferred that the discharge liquid be directed toward the orifice by the liquid introducing means.

Moreover, it is advantageous to control the flow of the mixture prior to entering the first zone. This may be accomplished by a gate valve or any other suitable device known in the art.

This method and apparatus are very useful in connection with polyamide granules which are generally produced by the synthetic fiber industry. Basically, the liquids employed in this industry are all readily pumpable, and are also usually clear. In practice, and for reasons of economy, it is almost always water that is used.

Following the method and apparatus according to this invention has many advantages. There is no damage to the granules and apparatus; investment cost in mixture transfer apparatus is reduced as is the cost of auxiliary material; and the amount of wash water used may be optimized. In addition, where polyamide granules are being treated in a washing column, the amount of inert gas necessary to convey the granular material in the head of the washing column is reduced. Further, no damage to the centrifuge and transfer apparatus is caused by clusters or wads or granular material that is stuck together. The latter is a particularly serious problem with past methods and apparatus.

The foregoing and other objects and advantages of the invention, as well as the basic characteristics thereof, including equivalents and substitutions therefor, are better understood by giving consideration to the detailed description of the preferred embodiment of the invention in the accompanying drawings, in which like reference characters indicate like parts.

Figure 2:
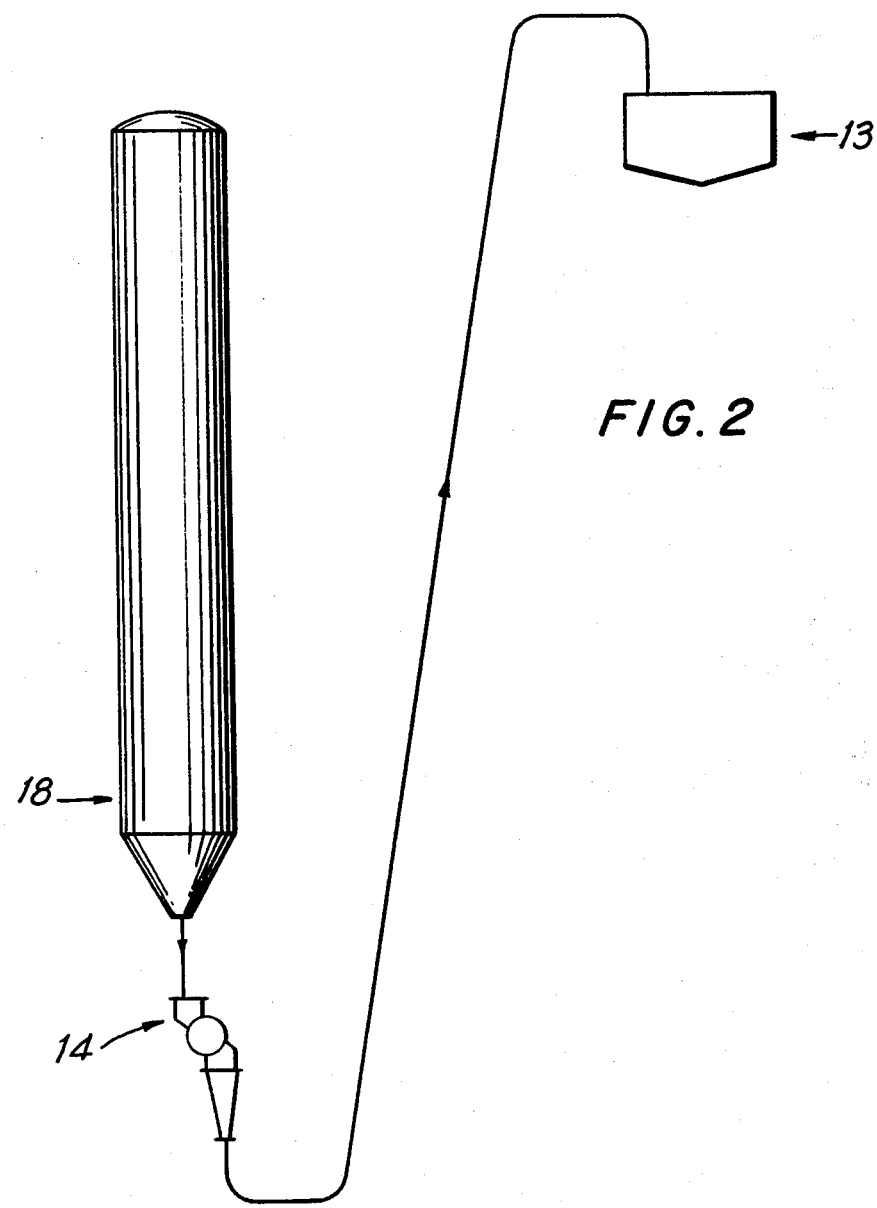

FIG. 1 is a partial cross-sectional side view of the preferred embodiment of the invention; and FIG. 2 is a schematic showing the position of the apparatus according to the invention between a washing column and a centrifuge.

Referring to FIGS. 1 and 2, a mixture of polyamide granules and water in washing column 18 is moved downwardly either to a gate valve (not shown) for regulation prior to transfer apparatus 14 or directly to transfer apparatus 14. When the mixture arrives at transfer apparatus 14, it fills inlet chamber 1 and flows down into rotary chamber 2 which is filled with rotary valve 3.

Rotary valve 3 rotates at a regular speed about axis 12 and comprises radially directed, circumferentially spaced apart rotors 15 which form rotating volumes 6.

When the mixture flows into rotary chamber 2, it fills volumes 6 and is then conveyed by the volumes past mixture-conveying side 17 to outlet 11. The mixture is then emptied from the rotating volumes at outlet 11 and flows into discharge chamber 7.

The rate of flow of granules from inlet chamber 1 into rotating volumes 6 is controlled by the selective withdrawal of liquid from chamber 2 through liquid withdrawing means 5. The faster that liquid is withdrawn through means 5, the more quickly the volumes 6 fill with granules. The granules should be controlled so that no volumes 6 become filled to more than 50% of their capacity with solids.

Protecting member 4 is affixed to the mixture-conveying side of inlet chamber 1. This member 4 has its lower portion spaced apart from rotors 15 to prevent granules flowing down through inlet chamber 1 from being crushed between rotors 15 and rotary chamber 2.

Liquid-injecting means 8 are located in rotary chamber 2 adjacent outlet 11 and inject an additional liquid (usually the same as the washing liquid) into outlet 11 and rotating volumes 6 to produce a turbulence therein. This turbulence insures that the solids will empty from the volumes 6 into the outlet 11 and that outlet 11 will always be substantially filled with liquid and additional liquid.

From outlet 11, volumes 6 continue through return side 16 past liquid withdrawing means 5 to again receive granules flowing through inlet chamber 1.

The mixture flows from outlet chamber 11 into discharge chamber 7 and then out through orifice 10 to the next apparatus which is centrifuge 13 in this case.

Discharge chamber 7 tapers as it approaches orifice 10 and has liquid introducing means 9 for adding a flow of discharge liquid to maintain a uniform flow of the mixture out orifice 10.

If the liquid involved in water, and no water is removed from means 5, the absolute speed of the granules is equal to the sinking speed. The sinking speed should be about 0.1 m/sec. As soon as water is removed at means 5, the absolute speed of the granules increases and, consequently, more granules pass through inlet chamber 1 in a given period. The location of the washing column 18, transfer apparatus 14, and centrifuge 13 as shown in FIG. 2 are not critical and may be varied.

The following example illustrates the invention, (See FIGS. 1 and 2).

Polyamide granules (nylon 6, diameter 2 mm, length of cylinder 2 mm) are washed continuously with wash water in a counter-current washing column 18. The granules are then continuously conveyed through transfer apparatus 14 into centrifuge 13 by the addition of fresh water ("transfer water"). To accomplish this, 400 kg of polyamide granules per hour and a little wash water are passed from the washing column 18 into inlet chamber 1 of transfer apparatus 14. Much of the wash water is withdrawn via tube 5 and the polyamide granules are conveyed into the discharge chamber 7 by means of the rotating volumes 6. The rotary valve 3 has rotors 15 that give the valve a rotor diameter of 300 mm and an inside width of 220 mm. There are eight rotors 15 and eight volumes 6. The volumes 6 are filled with polyamide granules to about 2/5 of their volume. The rotary valve turns in the direction of the arrow at a speed of 3 rpm.

The granules are seized in discharge chamber 7 by the fresh water flow from means 8 and tube 9 and then conveyed through orifice 10 to centrifuge 13. Centrifuge 13 then separates the transfer water from the granules and the water is returned to the circuit to be used again as transfer water. The granules obtained are completely undamaged.

What we claim is:

1. A method of continuously transferring pourable solids and controlling the flow thereof which comprises
    mixing said solids with a liquid of lesser density to form a mixture,
    moving said mixture downwardly into an inlet zone so that said inlet zone is filled with liquid,
    moving said mixture downwardly from said inlet zone into a rotary zone, said rotary zone comprising radially directed, circumferentially spaced apart volumes which are rotating at a uniform speed,
    conveying discrete portions of said mixture along a path that describes a section of a circle by means of said volumes to an outlet zone circumferentially spaced apart from said inlet zone,
    emptying said mixture from said rotating volumes into said outlet zone,
    injecting an additional liquid of lesser density than said solids into or adjacent said volumes at said outlet zone to produce a turbulence in said volumes and said outlet zone so that said solids empty from said volumes into said outlet zone, and said outlet zone is filled with said liquid and said additional liquid,
    controlling the movement of said mixture from said inlet zone into said rotary zone by selectively withdrawing said liquid from said rotary zone and after the emptying of said volumes so that the movement of said mixture into said rotary zone results in a level of solids in said volumes which is below a level at which said solids are damaged by said rotating volumes and rotary zone.

2. The method according to claim 1 further comprising moving said solids from said outlet zone through a discharge zone.

3. The method according to claim 2 wherein said discharge zone tapers from said outlet zone.

4. The method according to claim 2 further comprising selectively introducing a flow of discharge liquid into said discharge zone so that said mixture is uniformly conveyed through said discharge zone.

5. The method according to claim 4 wherein said discharge liquid is introduced downwardly into said discharge zone.

6. The method according to claim 1 wherein said inlet zone is in an inlet chamber, said rotary zone is in a rotary chamber, and said volumes are spaced apart by rotors, further comprising placing a protecting member in said inlet chamber adjacent the inner wall of said inlet chamber toward which said volumes rotate and spacing said member apart from said rotors whereby said solids are prevented from being crushed between said inlet chamber and said rotors.

7. The method according to claim 1 wherein said withdrawing of said liquid is performed substantially opposite said injecting of said additional liquid.

8. The method according to claim 2 wherein said step of moving said solids from said outlet through said discharge zone further comprises moving said solids downwardly from said outlet zone.

9. The method according to claim 1 further comprising locating said inlet zone and said outlet zone oppositely about the circumference of the rotary zone.

10. The method according to claim 1 wherein the liquid is water.

11. The method according to claim 1 wherein the pourable solids are granular.

12. The method according to claim 11 wherein the granular solids are a polymer.

13. The method according to claim 12 wherein the polymer is polyamide.

14. The method according to claim 1 wherein said solids are mixed with said liquid during treatment of said solids by said liquid in a previous process step.

15. The method according to claim 14 wherein said solids were treated in a column in the previous process step.

16. The method according to claim 1 wherein the flow of said solids is subject to control prior to entering said inlet zone.

17. The method according to claim 1 wherein said mixture is transferred to a centrifuge after said discharge zone.

18. The method according to claim 1 further comprising rotating said compartments at a speed that permits the movement of said solids into said rotary zone to be regulated by the withdrawal of said liquid so that said solids are not damaged by said rotating volumes.

19. The method according to claim 1 wherein the movement of said solids is regulated so that no rotating volume fills with more than 50% solids by volume.

20. The method according to claim 1 wherein the sink rate of the pourable solids is approximately 0.1 m/sec.

21. A method of claim 1 wherein said liquid is withdrawn from said rotary zone immediately prior to said inlet zone.

* * * * *